United States Patent
Chen et al.

(10) Patent No.: US 9,829,206 B2
(45) Date of Patent: Nov. 28, 2017

(54) DEHUMIDIFIER, COMPRESSOR AND DEHUMIDIFIER CONTROL METHOD

(71) Applicant: TCL AIR CONDITIONER (ZHONGSHAN) CO., LTD, Zhongshan, Guangdong (CN)

(72) Inventors: Chengbin Chen, Zhongshan (CN); Xianxiong Zhang, Zhongshan (CN); Ying Suo, Zhongshan (CN); Yang Chen, Zhongshan (CN)

(73) Assignee: TCL AIR CONDITIONER (ZHONGSHAN) CO., LTD, Zhongshan (CN)

( * ) Notice: Subject to any disclaimer, the term of this patent is extended or adjusted under 35 U.S.C. 154(b) by 277 days.

(21) Appl. No.: 14/587,010

(22) Filed: Dec. 31, 2014

(65) Prior Publication Data
US 2016/0061460 A1    Mar. 3, 2016

(30) Foreign Application Priority Data

Aug. 29, 2014   (CN) .......................... 2014 1 0436983

(51) Int. Cl.
*F16L 3/22* (2006.01)
*F24F 3/14* (2006.01)
*G01K 1/14* (2006.01)

(52) U.S. Cl.
CPC .................. *F24F 3/14* (2013.01); *G01K 1/14* (2013.01); *F24F 2003/144* (2013.01)

(58) Field of Classification Search
USPC ........................................................ 248/68.1
See application file for complete search history.

(56) References Cited

U.S. PATENT DOCUMENTS

| | | | | |
|---|---|---|---|---|
| 4,109,992 A * | 8/1978 | Hughes | ................ | H01R 13/567 439/620.21 |
| 6,315,527 B1 * | 11/2001 | Makino | .................... | H02K 3/12 310/198 |
| 7,056,104 B2 * | 6/2006 | Kimura | ............... | F04C 18/0215 310/71 |
| 8,246,246 B2 * | 8/2012 | Wakabayashi | ........... | G01K 1/14 320/150 |
| 8,610,527 B2 * | 12/2013 | Oh | ........................ | F16D 27/112 192/84.96 |
| 2011/0136364 A1 * | 6/2011 | Montrade | .......... | H01R 13/5202 439/271 |
| 2011/0308046 A1 * | 12/2011 | Weiss | ...................... | F16G 11/00 24/122.6 |

* cited by examiner

*Primary Examiner* — Monica Millner

(57) ABSTRACT

The present invention discloses a dehumidifier, a compressor and dehumidifier control method. A terminal cover is arranged at the top of the compressor, a mounting base and a wire outlet seat are arranged on the terminal cover, the mounting base is provided with a fixing groove used for mounting a first temperature detecting device for detecting the temperature at the top of the compressor, a bottom opening communicated with the top of the compressor is arranged at the bottom end of the fixing groove used for enabling the first temperature detecting device to prop against the top of the compressor and detect the temperature at the top of the compressor; the wire outlet seat is provided with a wiring groove used for mounting connecting wires of the compressor, and a clamping slot used for mounting a second temperature detecting device for detecting the temperature of the connecting wires.

8 Claims, 9 Drawing Sheets

DEHUMIDIFIER, COMPRESSOR AND DEHUMIDIFIER CONTROL METHOD

CROSS-REFERENCE TO RELATED APPLICATIONS

This present application claims the benefit of Chinese Patent Application No. 201410436983.3 filed on Aug. 29, 2014, the contents of which are hereby incorporated by reference.

BACKGROUND

1. Technical Field

The present invention relates to the technical field of compressors, and particularly, to a dehumidifier, a compressor and a dehumidifier control method.

2. Description of Related Art

A compressor is an important component of such heat exchange apparatuses as a dehumidifier and an air conditioner and the like, and is one of the most frequently working components in this kind of apparatuses. Therefore, when the compressor works for a long time, the coil thereof is liable to burn out due to overheat, and even cause a fire.

When the air conditioner operates, in order to prevent the tripping or burnout of the coil of the compressor due to over high temperature, the approach in the prior art is to dispose a temperature detecting device on the exhaust pipe of the compressor to detect the exhaust temperature, in order to adjust the frequency of the compressor according to the exhaust temperature to protect the compressor. However, the temperature detected in this manner is not the actual temperature of the coil of the compressor, thus the compressor is still in danger of being burnt out. Moreover, with reference to FIG. 1, FIG. 1 is a schematic diagram of a part of structure of a compressor in the prior art; as shown in FIG. 1, three connecting wires 6 of a conventional compressor 5 are bundled together by a PVC protective sleeve 7 and are led out together to be connected to a power supply, this structure is liable to concentrate the heat generated among the three connecting wires 6 in the PVC protective sleeve 7, resulting in that the connecting wires 6 are liable to burn out due to over high temperature. In addition, since the working current of the conventional compressor 5 is generally large, when the large current flows by the conducting wires, the connecting wires will be heated, and when the working time of the conventional compressor 5 is quite long or when the large current flows by the connecting wires 6, it is possible the connecting wires are burnt out due to overheat.

In summary, the coil and the connecting wires of the compressor generate heat when the compressor is at work, such that the frequency of causing fire of the compressor is very high.

The above-mentioned contents are merely used for helping understand the technical solutions of the present invention, but it does not mean that the above-mentioned contents are acknowledged as the prior art.

SUMMARY

The main object of the present invention is to solve the technical problem that that an existing compressor is liable to burn out.

To achieve the above-mentioned object, the present invention provides a compressor. A terminal cover is arranged at the top of the compressor, a mounting base and a wire outlet seat are arranged on the terminal cover, the mounting base is provided with a fixing groove used for mounting a first temperature detecting device for detecting the temperature at the top of the compressor, a bottom opening communicated with the top of the compressor is arranged at the bottom end of the fixing groove, and the bottom opening is used for enabling the first temperature detecting device to prop against the top of the compressor and detect the temperature at the top of the compressor; the wire outlet seat is provided with a wiring groove used for mounting connecting wires of the compressor, and a clamping slot used for mounting a second temperature detecting device for detecting the temperature of the connecting wires.

Preferably, a side opening communicated with the fixing groove and used for inserting the first temperature detecting device in the fixing groove is arranged on the side face of the mounting base.

Preferably, an elastic piece used for propping the first temperature detecting device to one side of the bottom opening of the fixing groove is arranged in the fixing groove.

Preferably, a through hole communicated with the fixing groove is arranged at the side opposite to the bottom opening of the fixing groove on the mounting base, the elastic piece is located in the through hole, the two ends of the elastic piece are embedded and fixed in the inner side walls at the two sides of the through hole, and the middle part of the elastic piece protrudes towards the interior of the fixing groove.

Preferably, a communication opening communicating the clamping slot with the wiring groove is arranged on the wire outlet seat, and the communication opening is used for contacting the second temperature detecting device with the connecting wires.

Preferably, the wire outlet seat and the top of the compressor form a cavity with at least one open end, and a first cantilever and a second cantilever, which are arranged oppositely, are arranged in the cavity; the wiring groove includes a first wiring sub-groove and a second wiring sub-groove, which are arranged oppositely; the first wiring sub-groove is arranged at the side of the first cantilever opposite to the second cantilever, and the second wiring sub-groove is arranged at the side of the second cantilever opposite to the first cantilever; the clamping slot includes a first sub-clamping slot and a second sub-clamping slot, which are arranged oppositely, the first sub-clamping slot is arranged at the side of the first cantilever opposite to the second cantilever, and the second sub-clamping slot is arranged at the side of the second cantilever opposite to the first cantilever.

Preferably, a first elastic element connected with or propped against the first cantilever and the inner wall of the cavity is arranged between the first cantilever and the inner wall of the cavity; a second elastic element connected with or propped against the second cantilever and the inner wall of the cavity is arranged between the second cantilever and the inner wall of the cavity.

Preferably, the first elastic element includes a first arched portion arranged to be corresponding to the position of the first wiring sub-groove and a second arched portion arranged to be corresponding to the position of the first sub-clamping slot; the first arched portion and the second arched portion respectively include an arched concave surface and an arched convex surface, and the arched convex surfaces of the first arched portion and the second arched portion are respectively propped against the first cantilever; the second elastic element includes a third arched portion arranged to be corresponding to the position of the second wiring sub-groove and a fourth arched portion arranged to be corresponding to the position of the second sub-clamping slot; the third arched portion and the fourth arched portion respectively include an arched concave surface and an arched convex surface, and the arched convex surfaces of the third arched portion and the fourth arched portion are respectively propped against the second cantilever.

In addition, in order to achieve the above-mentioned purpose, the present invention further provides a dehumidifier, including the above-mentioned compressor. A terminal cover is arranged at the top of the compressor, a mounting base and a wire outlet seat are arranged on the terminal cover, the mounting base is provided with a fixing groove used for mounting a first temperature detecting device for detecting the temperature at the top of the compressor, a bottom opening communicated with the top of the compressor is arranged at the bottom end of the fixing groove, and the bottom opening is used for enabling the first temperature detecting device to prop against the top of the compressor and detect the temperature at the top of the compressor; the wire outlet seat is provided with a wiring groove used for mounting connecting wires of the compressor, and a clamping slot used for mounting a second temperature detecting device for detecting the temperature of the connecting wires;

the dehumidifier further includes a control device, and a blower and a humidity detecting device, which are respectively connected with and controlled by the control device, wherein the compressor is electrically connected with the control device.

In addition, in order to achieve the above-mentioned purpose, the present invention further provides a dehumidifier control method, including:

detecting the current ambient humidity, and when the current ambient humidity is larger than a first preset humidity value, controlling the blower and the compressor of the dehumidifier to be powered on for starting;

collecting the temperature at the top of the compressor and the temperature of the connecting wires at a preset time interval;

when the temperature at the top of the compressor is larger than a first preset threshold, or when the temperature of the connecting wires is larger than a second preset threshold, controlling the compressor to stop working.

Preferably, the step of when the temperature at the top of the compressor is larger than the first preset threshold, or when the temperature of the connecting wires is larger than the second preset threshold, controlling the compressor to stop working further includes:

if the temperature at the top of the compressor is not larger than the first preset threshold and the temperature of the connecting wires is not larger than the second preset threshold, then when the temperature at the top of the compressor is larger than a third preset threshold, or when the temperature of the connecting wires is larger than a fourth preset threshold, controlling the compressor to be powered on according to the preset time interval, wherein the third preset threshold is smaller than the first preset threshold, and the fourth preset threshold is smaller than the second preset threshold.

Preferably, the dehumidifier control method further includes:

when the time of controlling the compressor to stop working is larger than a first preset time value, returning to implement the step of detecting the current ambient humidity, and when the current ambient humidity is larger than the first preset humidity value, controlling the blower and the compressor of the dehumidifier to be powered on for starting.

In the present invention, the terminal cover is arranged at the top of the compressor, the mounting base and the wire outlet seat are arranged on the terminal cover, the fixing groove used for mounting the first temperature detecting device for detecting the temperature at the top of the compressor is arranged on the mounting base, and the wiring groove used for mounting the connecting wires of the compressor and the second temperature detecting device for detecting the temperature of the connecting wires are arranged on the wire outlet seat, the temperature at the top of the compressor is detected by the first temperature detecting device and the temperature of the connecting wires of the compressor is detected by the second temperature detecting device, in order to more accurately detect the temperature of the coil and the connecting wires of the compressor, so as to effectively prevent over high temperature of the coil and the connecting wires, thus protection on the compressor is achieved finally.

The implementation of purposes, functional features and advantages of the present invention will be further illustrated given with reference to the accompanying drawings in combination with the embodiments.

DETAILED DESCRIPTION

It should be understood that, the specific embodiments described herein are merely used for explaining the present invention, rather than limiting the present invention.

The present invention provides a compressor.

Figure 1:
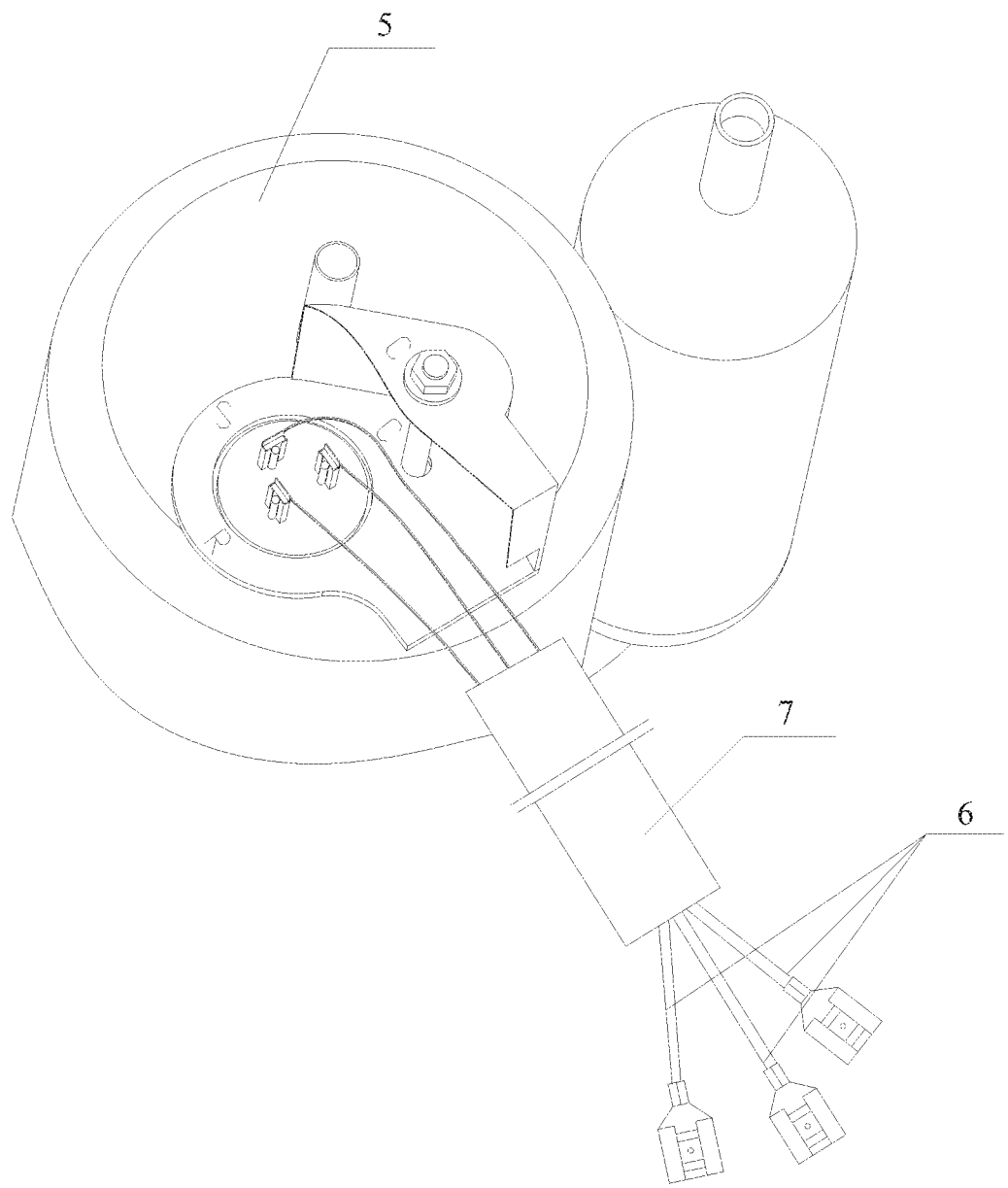
FIG. 1 is a partial schematic diagram of a structure of a compressor in the prior art.
Figure 2:
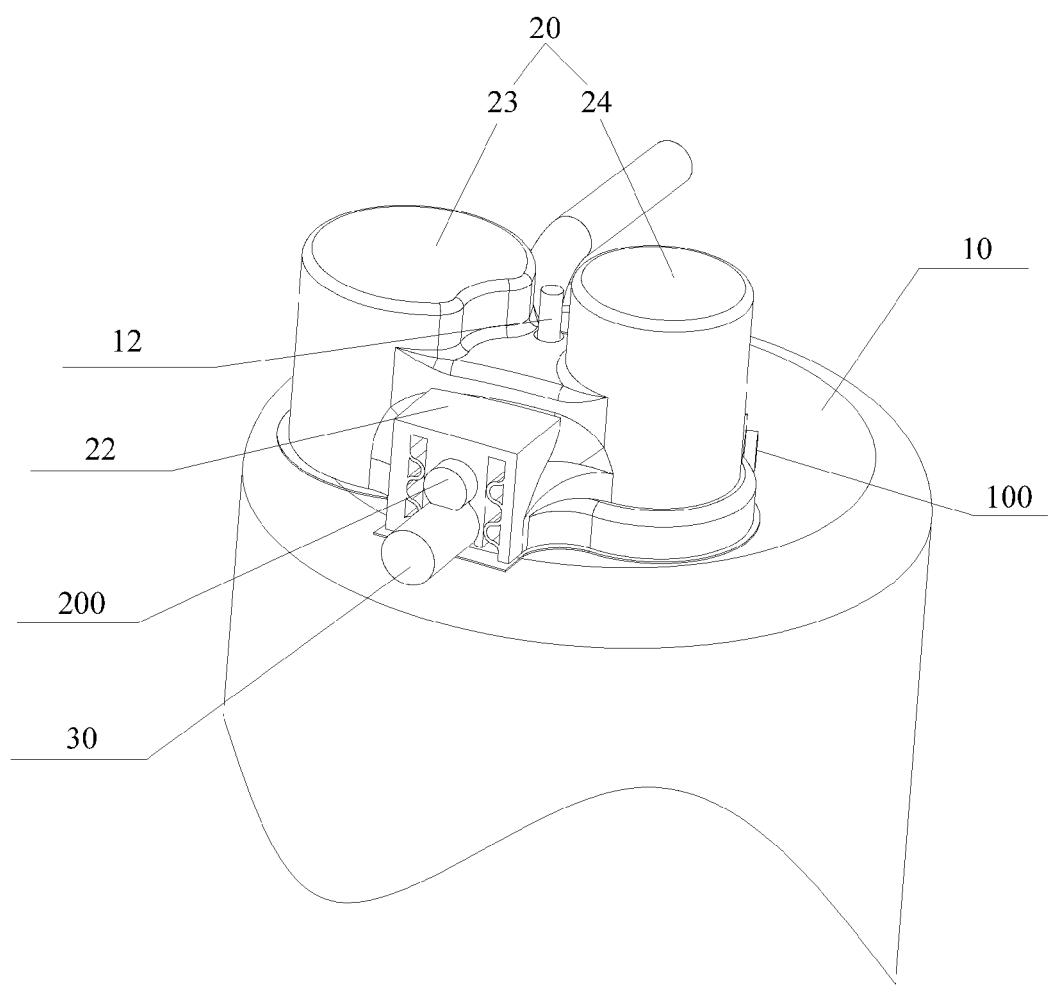
FIG. 2 is a partial schematic diagram of a structure of an embodiment of a compressor in the present invention.
Figure 3:
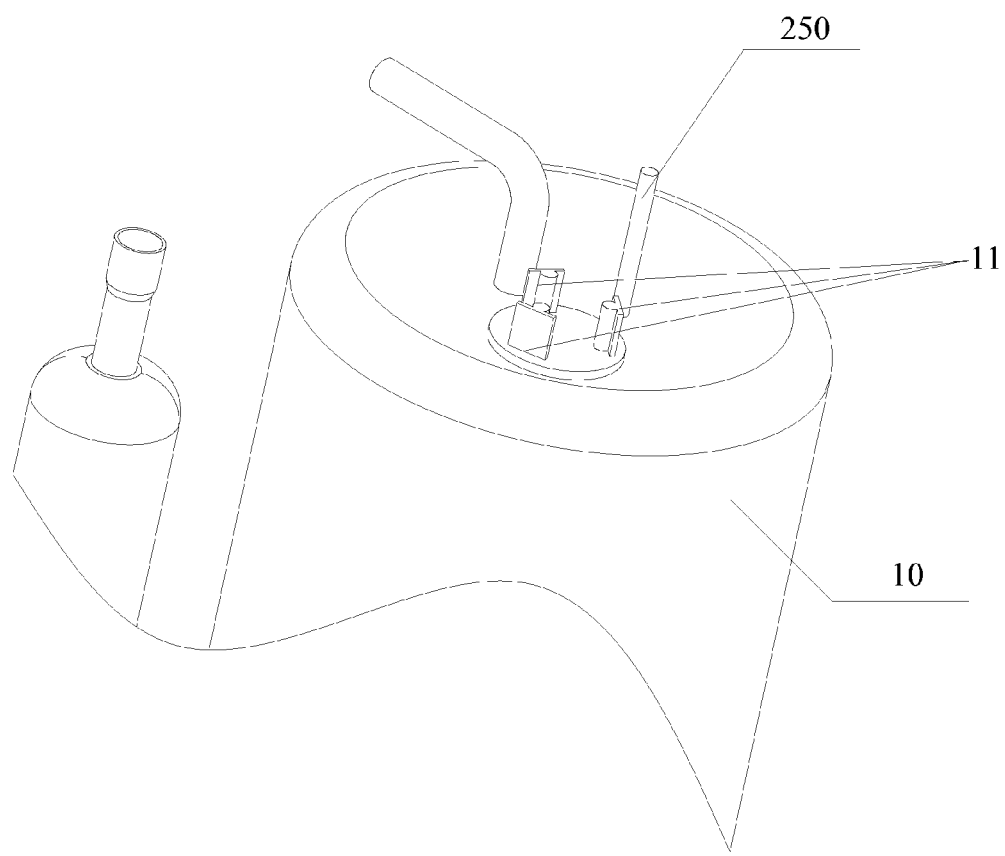
FIG. 3 is a schematic diagram of a part of structure of the compressor shown in FIG. 2.
Figure 4:
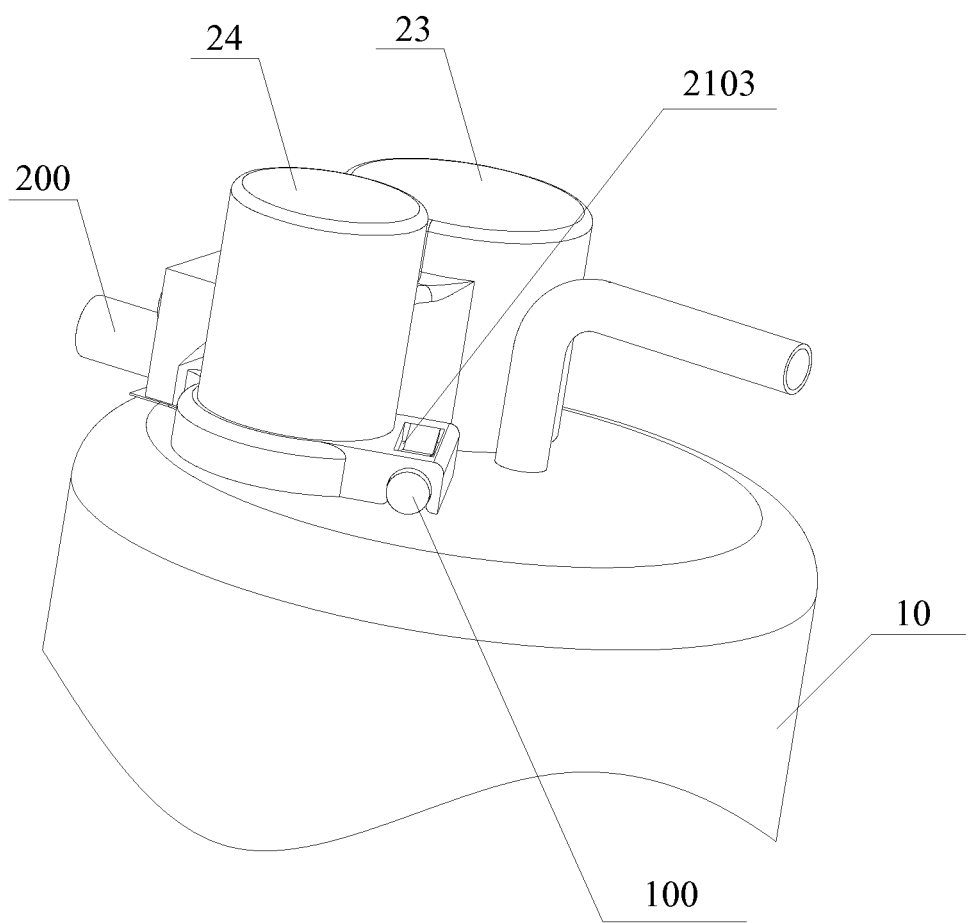
FIG. 4 is a schematic diagram of a structure at another visual angle of the compressor shown in FIG. 2.

With reference to FIG. 2 to FIG. 4, in an embodiment, a terminal cover 20 is arranged at the top of the compressor 10, a mounting base 21 and a wire outlet seat 22 are arranged on the terminal cover 20, the mounting base 21 is used for mounting a first temperature detecting device 100 for detecting the temperature at the top of the compressor 10; the wire outlet seat 22 is used for mounting connecting wires 30 of the compressor 10 and is used for mounting a second temperature detecting device 200 for detecting the temperature of the connecting wires.

During mounting, the terminal cover 20 is firstly fixed at the top of the compressor 10, then the first temperature detecting device 100 and the second temperature detecting device 200 are correspondingly mounted on the mounting base 21 and the wire outlet seat 22, the first temperature detecting device 100 and the second temperature detecting device 200 are used for detecting the temperature at the top of the compressor 10 and the temperature on the surfaces of the connecting wires 30, so as to adjust the frequency of the compressor 10 according to the temperature at the top of the compressor 10 and the temperature of the connecting wires 30 to protect the compressor 10. It should be noted that, since the coil of the compressor 10 is located at the top of the compressor 10, the temperature at the top of the compressor 10 is closest to the real temperature of the coil of the compressor 10.

Specifically, three wiring terminals 11 are arranged at the top of the compressor 10, and a connecting wire 30 is connected to each wiring terminal 11. The above-mentioned terminal cover 20 includes a first end cover 23, a second end cover 24 and a connecting portion 25 connecting the first end cover 23 with the second end cover 24, the first end cover 23 is used for covering the three wiring terminals 11 to protect the wiring terminals 11; the second end cover 24 is a protector cover of the compressor 10, wherein a jack 250 is arranged on the connecting portion 25, a latch pin 12 is arranged at a position corresponding to the jack 250, at the top of the compressor 10, and by means of the cooperation of the latch pin 12 and the jack 250 on the connecting portion 25, the terminal cover 20 may be fixed on the compressor 10.

Preferably, the above-mentioned mounting base 21 is mounted at the bottom of the second end cover 24, for enabling the first temperature detecting device 100 to contact the top of the compressor 10 after being mounted; it may be understood that, the position of the mounting base 21 on the terminal cover 20 is not limited, as long as it is ensured that the first temperature detecting device 100 can contact the top of the compressor 10 after the temperature detecting device is mounted on the mounting base 21. The position of the above-mentioned wire outlet seat 22 is not limited as well, in the embodiment, the wire outlet seat 22 is arranged on the connecting portion 25, and the inner cavity of the wire outlet seat 22 is communicated with the inner cavity of the first end cover 23 for arranging the connecting wires 30.

It should be noted that, the first end cover 23, the second end cover 24, the connecting portion 25, the mounting base 21 and the wire outlet seat 22 may be integrally formed. The first temperature detecting device 100 and the second temperature detecting device 200 may be implemented by any suitable temperature sensors, and a temperature sensing bag is preferably used for detecting the temperature in the embodiment.

For the compressor 10 in the present invention, the terminal cover 20 is arranged at the top of the compressor 10, the mounting base 21 used for mounting the first temperature detecting device 100 for detecting the temperature at the top of the compressor 10 and the wire outlet seat 22 used for mounting the connecting wires 30 of the compressor 10 are mounted on the terminal cover 20, the second temperature detecting device 200 for detecting the temperature of the connecting wires is mounted on the wire outlet seat 22, the temperature at the top of the compressor 10 is detected by the first temperature detecting device 100 and the temperature of the connecting wires 30 of the compressor 10 is detected by the second temperature detecting device 200, to more accurately detect the temperature of the coil of the compressor 10 and the temperature of the connecting wires 30, so as to effectively prevent over high temperature of the coil and the connecting wires 30, thus protection on the compressor 10 is achieved finally.

Figure 5:
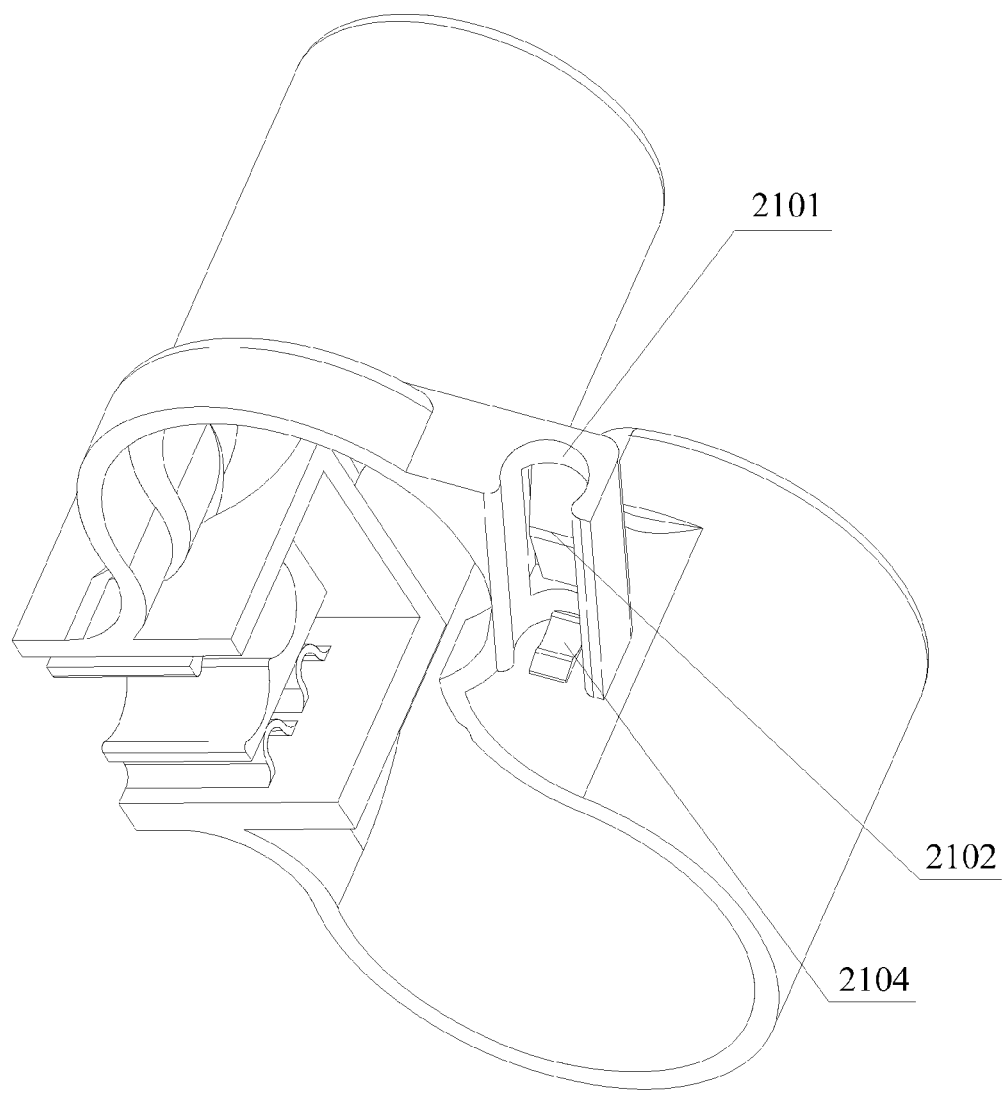
FIG. 5 is a schematic diagram of a structure of a terminal cover in the compressor shown in FIG. 2.
Figure 6:
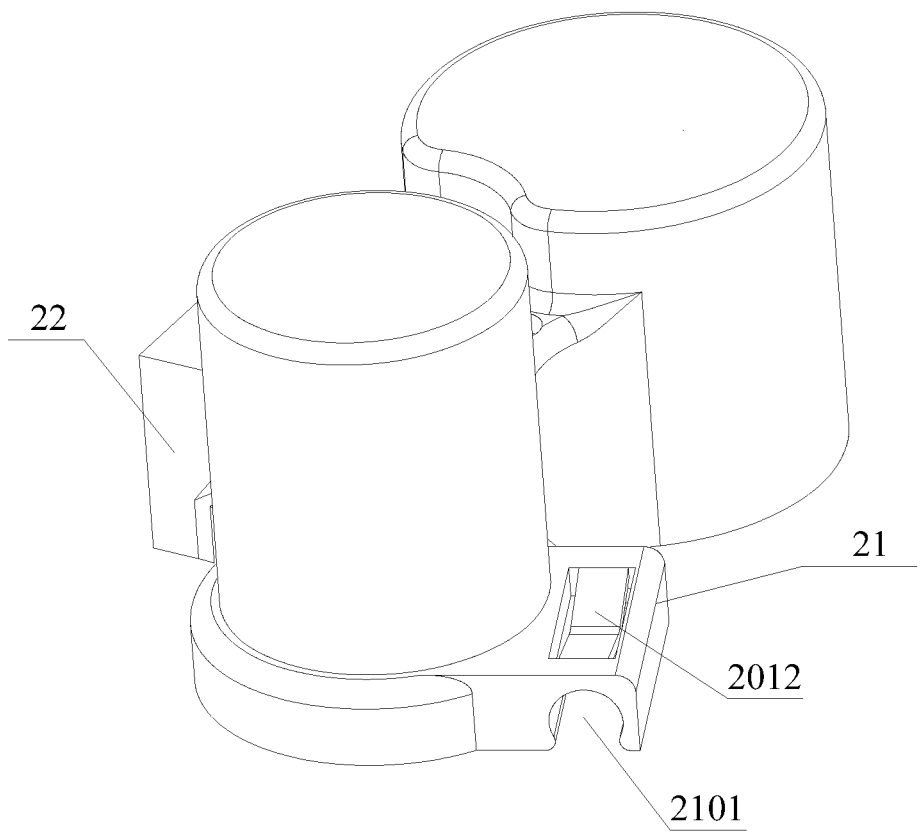
FIG. 6 is a schematic diagram of a structure at a first visual angle of the terminal cover shown in FIG. 5.

It may be understood that, the structure of the above-mentioned mounting base 21 may be specifically set as follows: as shown in FIG. 5 and FIG. 6, in the embodiment, the mounting base 21 includes a fixing groove 2101 used for holding the first temperature detecting device 100, the fixing groove 2101 is cylindrical, and the bottom thereof is opened to enable the first temperature detecting device 100 mounted in the fixing groove 2101 to expose from the bottom opening and directly contact the top of the compressor 10. In the embodiment, an opening is further arranged on the side face of the fixing groove 2101, and the first temperature detecting device 100 may be inserted in the fixing groove 2101 from the side opening of the fixing groove 2101 in order to detect the temperature of the compressor 10. Of course, in other embodiments, the first temperature detecting device 100 may also be integrally clamped in the fixing groove 2101 from the bottom opening of the fixing groove 2101. When the first temperature detecting device 100 is mounted in the fixing groove 2101, the part of the first temperature detecting device 100 located in the bottom opening of the fixing groove 2101 is in direct contact with the top of the compressor 10, so as to detect the temperature at the top of the compressor 10.

Further, to ensure the first temperature detecting device 100 is firmly and stably mounted in the fixing groove 2101, an elastic piece 2102 used for propping the first temperature detecting device 100 on one side of the bottom opening of the fixing groove 2101 is arranged in the fixing groove 2101.

Further, to ensure better contact of the first temperature detecting device 100 and the top of the compressor 10 in order to achieve accurate temperature detection, a through hole 2103 communicated with the fixing groove 2101 is arranged at the side opposite to the bottom opening of the fixing groove 2101, of the mounting base 21, the elastic piece 2102 is located in the through hole 2103, the two ends of the elastic piece 2102 are embedded and fixed in the inner side walls at the two sides of the through hole 2103, and the middle part of the elastic piece 2102 protrudes towards the interior of the fixing groove 2101 to prop against the first temperature detecting device 100 mounted in the fixing groove 2101, so as to push the first temperature detecting device 100 towards the top face of the compressor 10 to ensure firmer contact between the first temperature detecting device 100 and the top of the compressor 10. Due to arrangement of the through hole 2103, a required movement space when the elastic piece 2102 props against the first temperature detecting device 100 to deform may be ensured.

Further, the first temperature detecting device 100 is provided with an introducing end for inserting the first temperature detecting device 100 in the fixing groove 2101 from the side face opening of the fixing groove 2101; a limiting card 2104 for limiting the length of the first temperature detecting device 100 inserted in the fixing groove 2101 is further arranged in the fixing groove 2101, one end of the limiting card 2104 is fixed with the inner wall of the fixing groove 2101, and the other end of the limiting card is propped against the introducing end of the first temperature detecting device 100. In this case, the limiting card 2104 is a strip-shaped elastic piece with a certain radian. After one end of the limiting card 2104 is fixed with the inner wall of the fixing groove 2101, the other end of the limiting card is suspended and is close to the bottom opening of the fixing groove 2101, to prevent the first temperature detecting device 100 from being excessively inserted in the fixing groove 2101.

Figure 7:
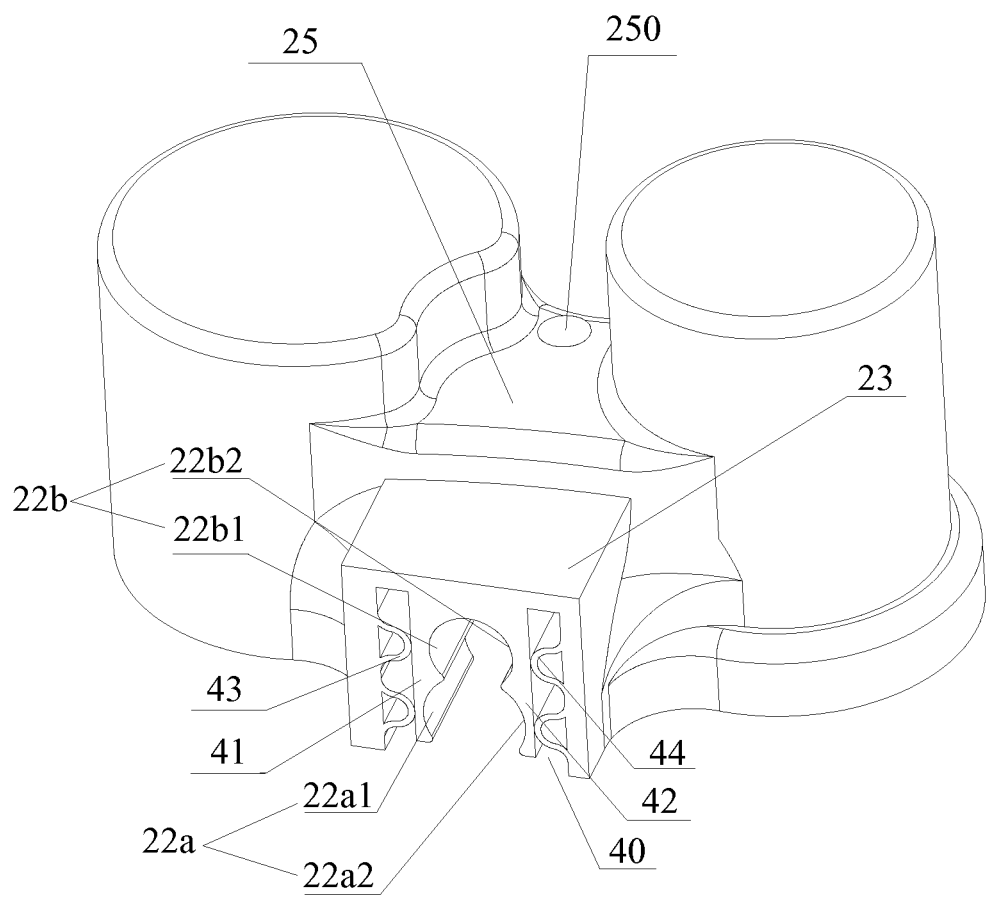
FIG. 7 is a schematic diagram of a structure at a second visual angle of the terminal cover shown in FIG. 5.

Based on the above-mentioned embodiment, further, as shown in FIG. 7, the wire outlet seat 22 includes a wiring groove 22*a* used for holding the connecting wires 30 and a clamping slot 22*b* used for holding the second temperature detecting device 200, a communication opening communicating the clamping slot 22*b* with the wiring groove 22*a* is arranged on the wire outlet seat 22, and the communication opening is used for contacting the second temperature detecting device 200 with the connecting wires 30. It may be understood that, when the second temperature detecting device 200 is mounted in the clamping slot 22*b* and the connecting wires 30 are mounted in the wiring groove 22*a*, the second temperature detecting device 200 can contact the connecting wires 30 via the communication opening to detect the temperature of the connecting wires 30.

Specifically, the wire outlet seat 22 and the top of the compressor 10 form a cavity 40 with at least one open end, and a first cantilever 41 and a second cantilever 42, which are arranged oppositely, are arranged in the cavity 40; the wiring groove 22*a* includes a first wiring sub-groove 22*a*1 and a second wiring sub-groove 22*a*2, which are arranged oppositely; the first wiring sub-groove 22*a*1 is arranged at the side of the first cantilever 41 opposite to the second cantilever 42, and the second wiring sub-groove 22*a*2 is arranged at the side of the second cantilever 42 opposite to the first cantilever 41; the clamping slot 22*b* includes a first sub-clamping slot 22*b*1 and a second sub-clamping slot 22*b*2, which are arranged oppositely, the first wiring sub-clamping slot 22*b* 1 is arranged at the side of the first cantilever 41 opposite to the second cantilever 42, and the second sub-clamping slot 22*b*2 is arranged at the side of the second cantilever 42 opposite to the first cantilever 41.

The object of the embodiment is to conveniently mount and detach the second temperature detecting device 200 and the connecting wires 30 of the compressor 10 by means of the elastic reset capability of the first cantilever 41 and the second cantilever 42.

Further, a first elastic element 43 connected with or propped against the first cantilever 41 and the inner wall of the cavity 40 is arranged between the first cantilever 41 and the inner wall of the cavity 40; a second elastic element 44 connected with or propped against the second cantilever 42 and the inner wall of the cavity 40 is arranged between the second cantilever 42 and the inner wall of the cavity 40. The first elastic element 43 and the second elastic element 44 are used for reinforcing the elastic reset capability of the first cantilever 41 and the second cantilever 42, to ensure better firmness of the second temperature detecting device 200 and the connecting wires 30 of the compressor 10 after mounting.

It may be understood that, the first elastic element 43 and the second elastic element 44 may be springs or arched elastic pieces with one or multiple segments of arcs, wherein the arched elastic pieces may be circular arc-shaped, S-shaped or m-shaped, and are not limited herein as long as the elastic reset capability of the first cantilever 41 and the second cantilever 42 can be reinforced.

In this case, one specific structure when the first elastic element 43 and the second elastic element 44 are arched elastic pieces is as follows: the first elastic element 43 includes a first arched portion arranged to be corresponding to the position of the first wiring sub-groove 22*a*1 and a second arched portion arranged to be corresponding to the position of the first sub-clamping slot 22*b*1; the first arched portion and the second arched portion respectively include an arched concave surface and an arched convex surface, and the arched convex surfaces of the first arched portion and the second arched portion are respectively propped against the first cantilever 41; the second elastic element 44 includes a third arched portion arranged to be corresponding to the position of the second wiring sub-groove 22*a*2 and a fourth arched portion arranged to be corresponding to the position of the second sub-clamping slot 22*b*2; the third arched portion and the fourth arched portion respectively include an arched concave surface and an arched convex surface, and the arched convex surfaces of the third arched portion and the fourth arched portion are respectively propped against the second cantilever 42.

It may be understood that, the arched convex surfaces may limit liable deformation of the parts of the first cantilever 41 and the second cantilever 42 corresponding to the wiring groove 22*a* and the clamping slot 22*b*, such that the force of the first cantilever 41 and the second cantilever 42 for clamping and fixing the second temperature detecting device 200 and the connecting wires 30 of the compressor 10 is reinforced, to ensure better firmness of the second temperature detecting device 200 and the connecting wires 30 of the compressor 10 after mounting.

The present invention further provides a dehumidifier, including a control device, and a blower and a humidity detecting device, which are respectively connected with and controlled by the control device, and the foregoing compressor, wherein the compressor is connected with the control device. The detailed structure of the compressor may refer to the above-mentioned embodiment, and will not be repeated herein; since the above-mentioned compressor is adopted in the dehumidifier, the dehumidifier provided by the present invention will not be burnt out due to over high temperature, thus the safety of the dehumidifier is improved.

Figure 8:
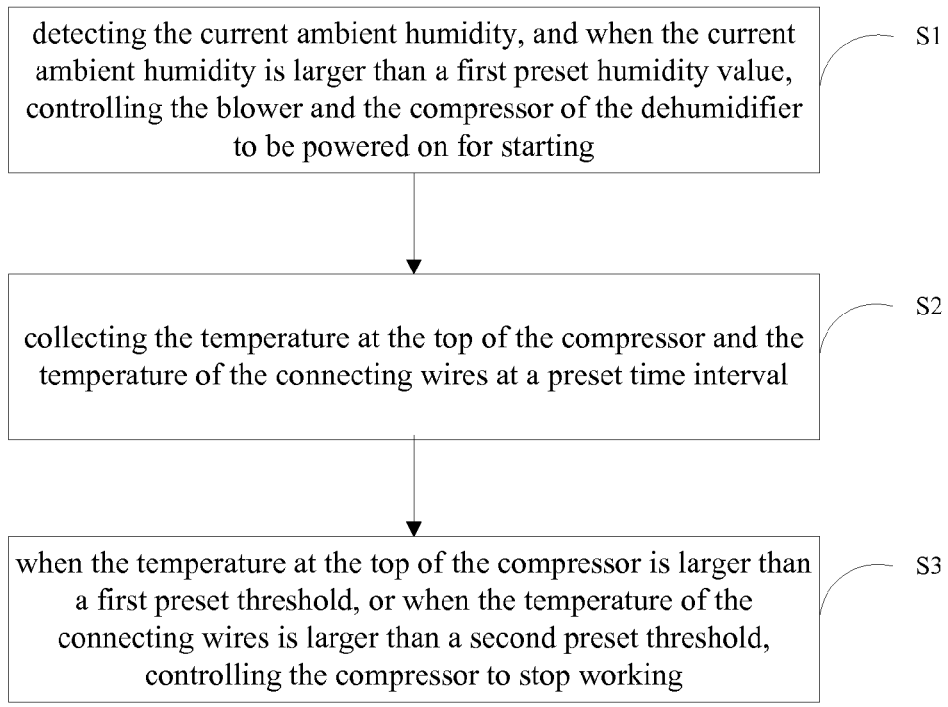
FIG. 8 is a schematic diagram of a flow of an embodiment of a dehumidifier control method in the present invention.

In addition, the present invention further provides a dehumidifier control method. In an embodiment, with reference to FIG. 8 and FIG. 9, the dehumidifier control method includes:

S1, detecting the current ambient humidity, and when the current ambient humidity is larger than a first preset humidity value, controlling the blower and the compressor of the dehumidifier to be powered on for starting;

S2, collecting the temperature at the top of the compressor and the temperature of the connecting wires at a preset time interval;

S3, when the temperature at the top of the compressor is larger than a first preset threshold, or when the temperature of the connecting wires is larger than a second preset threshold, controlling the compressor to stop working.

In the dehumidifier, the current ambient humidity is detected in real time or periodically by use of the humidity detecting device, in the embodiment, when the dehumidifier receives a starting signal, the humidity detecting device detects the current ambient humidity, and the control device judges whether the current ambient humidity is higher than set humidity; if so, detecting the humidity is continued, if not, the control device controls the blower and the compressor to start; at this time, the control device collects temperature signals detected by the first temperature detecting device and the second temperature detecting device at a preset time interval, for example, every 0.2 s, when detecting that the temperature at the top of the compressor is larger than the first preset threshold, or when the temperature of the connecting wires is larger than the second preset threshold, the control device stops working of the compressor immediately to protect the compressor, at this time, the blower continues to work, wherein the first preset threshold may be a limit temperature value which can be born by the coil of the compressor, and the second preset threshold may be a limit temperature value which can be born by the connecting wires of the compressor.

In addition, if the detected temperature at the top of the compressor is not larger than the first preset threshold and the temperature of the connecting wires of the compressor is not larger than the second preset threshold, a second layer condition is enabled, specifically as follows, the step S3 further includes:

when the temperature at the top of the compressor is larger than a third preset threshold, or when the temperature of the connecting wires is larger than a fourth preset threshold, the control device controls the compressor to be powered on according to the preset time interval, wherein the third preset threshold is smaller than the first preset threshold, and the fourth preset threshold is smaller than the second preset threshold.

The object of the embodiment is to adopt a periodical shutdown cooling method for the compressor to prevent overheat of the compressor, when the temperature of the compressor reaches a certain degree. When the compressor stops running, the blower stills runs, wherein the shutdown cooling time of the compressor may be set to be very short, for example, after being shut down for 10 minutes, the compressor is powered on again to run for 10 minutes, and then is shut down for 10 minutes, and the process is circulated in this manner to power on the compressor at intervals, so as to ensure reliable and safe operation of the compressor.

Figure 9:
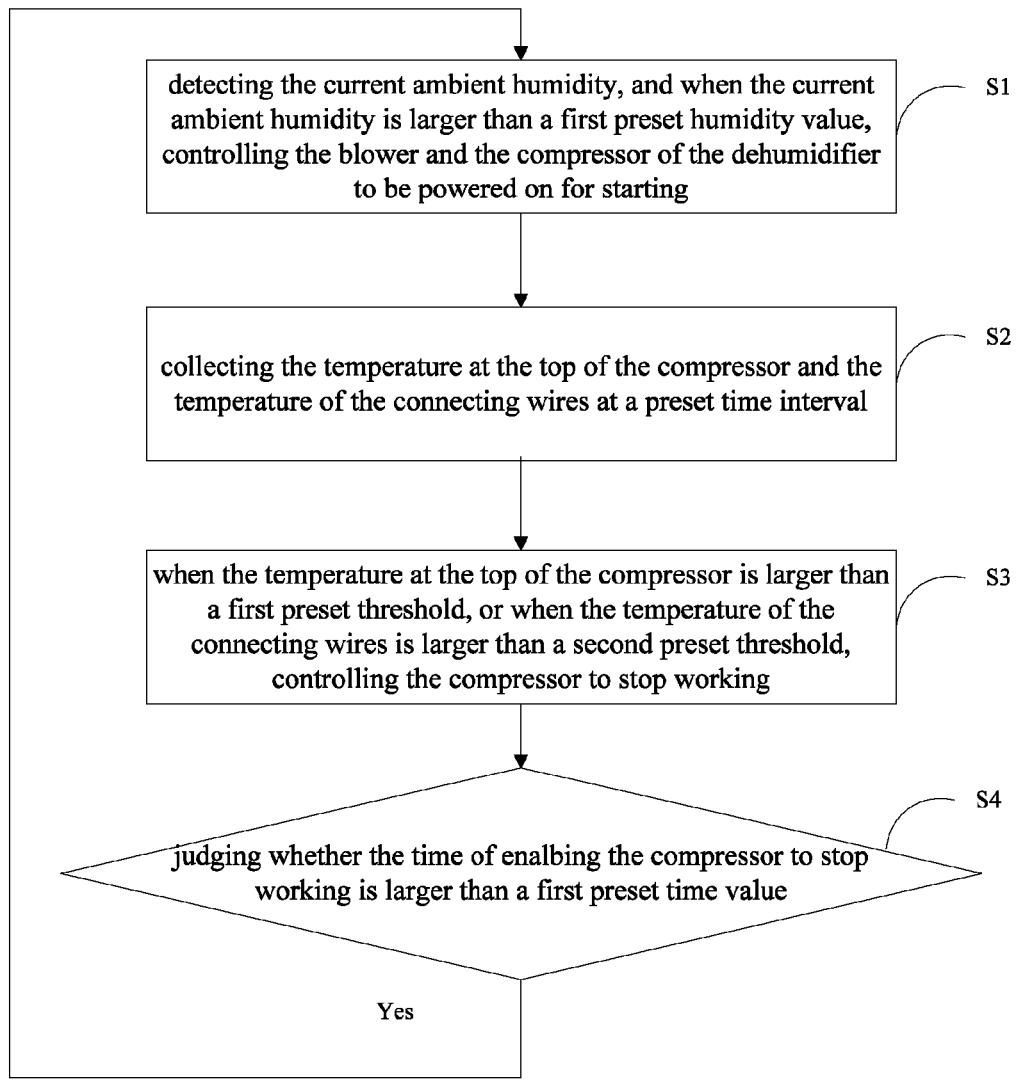
FIG. 9 is a schematic diagram of a flow of another embodiment of a dehumidifier control method in the present invention.

Further, see FIG. 9, the dehumidifier control method further includes:

S4, when the time of the control device for controlling the compressor to stop working is larger than a first time value, returning to implement step S1.

After shutdown cooling for a period of time, the compressor may be used again. In this case, the first preset time may be set according to the environment of the compressor, when the ambient temperature of the compressor is low, the compressor is quickly cooled, and the first preset time value may be set to be very short; when the ambient temperature of the compressor is high, the compressor is slowly cooled down, the first preset time may be set to be longer, and the first preset time value is set to 30 minutes in the embodiment.

In the method provided by the present invention, by detecting the temperature at the top of the compressor and the temperature of the connecting wires of the compressor, and when the temperature at the top of the compressor is larger than the first preset threshold, or when the temperature of the connecting wires is larger than the second preset threshold, the control device controls the compressor to stop working, in order to prevent the coil of the compressor and the power supply connecting wires from being burnt out by overheat, thus protection on the compressor is achieved finally.

The foregoing descriptions are merely preferred embodiments of the present invention, but the patent scope of the present invention is not limited thereto. Any equivalent structures or equivalent flow variations made according to the description and accompanying drawings of the present invention, and direct or indirect applications in other related technical fields, are still encompassed in the patent protection scope of the present invention in the same way.

What is claimed is:

1. A compressor, comprising:
    a terminal cover, arranged at a top of the compressor;
    a mounting base, arranged on the terminal cover;
    a wire outlet seat, arranged on the terminal cover;
    a first temperature detecting device, for detecting a temperature at the top of the compressor;
    a fixing groove, arranged on the mounting base, for mounting the first temperature detecting device;
    a bottom opening, arranged at a bottom end of the fixing groove, communicating with the top of the compressor, configured for enabling the first temperature detecting device to prop against the top of the compressor and detect the temperature at the top of the compressor;
    a wiring groove, arranged on the wire outlet seat, for mounting connecting wires of the compressor;
    a second temperature detecting device, for detecting a temperature of the connecting wires;
    a clamping slot, for mounting the second temperature detecting device.

2. The compressor of claim 1, wherein a side opening communicated with the fixing groove and used for inserting the first temperature detecting device in the fixing groove is arranged on a side face of the mounting base.

3. The compressor of claim 1, wherein an elastic piece used for propping the first temperature detecting device to one side of the bottom opening of the fixing groove is arranged in the fixing groove.

4. The compressor of claim 3, wherein a through hole communicated with the fixing groove is arranged at a side opposite to the bottom opening of the fixing groove on the mounting base, the elastic piece is located in the through hole, two ends of the elastic piece are embedded and fixed in inner side walls at two sides of the through hole, and a middle part of the elastic piece protrudes towards an interior of the fixing groove.

5. The compressor of claim 1, wherein a communication opening communicating the clamping slot with the wiring groove is arranged on the wire outlet seat, and the communication opening is used for contacting the second temperature detecting device with the connecting wires.

6. The compressor of claim 5, wherein the wire outlet seat and the top of the compressor form a cavity with at least one open end, and a first cantilever and a second cantilever, which are arranged oppositely, are arranged in the cavity; the wiring groove comprises a first wiring sub-groove and a second wiring sub-groove, which are arranged oppositely; the first wiring sub-groove is arranged at a side of the first cantilever opposite to the second cantilever, and the second wiring sub-groove is arranged at a side of the second cantilever opposite to the first cantilever; the clamping slot comprises a first sub-clamping slot and a second sub-clamping slot, which are arranged oppositely, the first sub-clamping slot is arranged at the side of the first cantilever opposite to the second cantilever, and the second sub-clamping slot is arranged at the side of the second cantilever opposite to the first cantilever.

7. The compressor of claim 6, wherein a first elastic element connected with or propped against the first cantilever and an inner wall of the cavity is arranged between the first cantilever and the inner wall of the cavity; a second elastic element connected with or propped against the second cantilever and the inner wall of the cavity is arranged between the second cantilever and the inner wall of the cavity.

8. The compressor of claim 7, wherein the first elastic element comprises a first arched portion arranged to be corresponding to the position of the first wiring sub-groove and a second arched portion arranged to be corresponding to the position of the first sub-clamping slot; the first arched portion and the second arched portion respectively comprise an arched concave surface and an arched convex surface, and the arched convex surfaces of the first arched portion and the second arched portion are respectively propped against the first cantilever; the second elastic element comprises a third arched portion arranged to be corresponding to the position of the second wiring sub-groove and a fourth arched portion arranged to be corresponding to the position of the second sub-clamping slot; the third arched portion and the fourth arched portion respectively comprise an arched concave surface and an arched convex surface, and the arched convex surfaces of the third arched portion and the fourth arched portion are respectively propped against the second cantilever.

* * * * *